Nov. 18, 1941.   P. BERMAN   2,262,748
SYSTEM OF HEATING WATER BY DIFFERENTIAL PRESSURE CIRCULATION
Filed June 20, 1938   2 Sheets-Sheet 2

PHILIP BERMAN
INVENTOR.
BY Joseph Blacker
ATTORNEY.

Patented Nov. 18, 1941

2,262,748

UNITED STATES PATENT OFFICE 2,262,748

SYSTEM OF HEATING WATER BY DIFFERENTIAL PRESSURE CIRCULATION

Philip Berman, New York, N. Y., assignor to Albe Pump Corp., Brooklyn, N. Y., a corporation of New York Application June 20, 1938, Serial No. 214,845

5 Claims. (Cl. 122—32)

This invention relates to hot water heating systems in which water for domestic use is heated in connection with or independent of the heating of the building.

An object of this invention is to produce a hot water heating system in which the water supply for the system is under pressure and produces a high suction in a water circulator placed in the boiler return pipe line and which operates with a Venturi effect and augments the convection current circulation of water through the heating system.

Another object of this invention is to provide a forced circulation hot water heating system having a pressure operated valve for automatically increasing the quantity of water supplied to the hot water tank during the time of peak consumption.

Another object of this invention is to provide acceleration of circulation in the hot water heating system by utilizing the city water supply pressure and without any pumping apparatus having moving parts or control devices.

Another object of this invention is to provide a circulator comprising a Venturi effect flow-accelerating means in the fluid circulating line of a hot water heating system, the said circulator having a circumscribing storage chamber with an inlet for supply water and being in communication with a valve leading to a hot water storage tank, the valve being loaded to prevent passage of supply water to said storage tank but permitting passage therethrough to said tank when the pressure in said tank drops below a predetermined pressure.

In the ordinary hot water heating system dependence is placed entirely upon the normal circulation of the water brought about by gravity and convection currents of the fluid within the supply and return lines. In this practice, most of the time, the water in the storage tank is hot only from the middle to the top, due to the sluggishness in the circulation.

Bringing about forced circulation by an electrically operated pump requires complicated devices for starting and stopping the motor, also the use of electric current to the motor.

In the operation of my invention I utilize the pressure of the city water supply. This water pressure has heretofore been utilized for filling the hot water storage tank and was connected to the bottom of the hot water storage tank.

Reference will now be had to the drawings, wherein like numerals of reference designate corresponding parts throughout the several views, in which.

Figure 1:
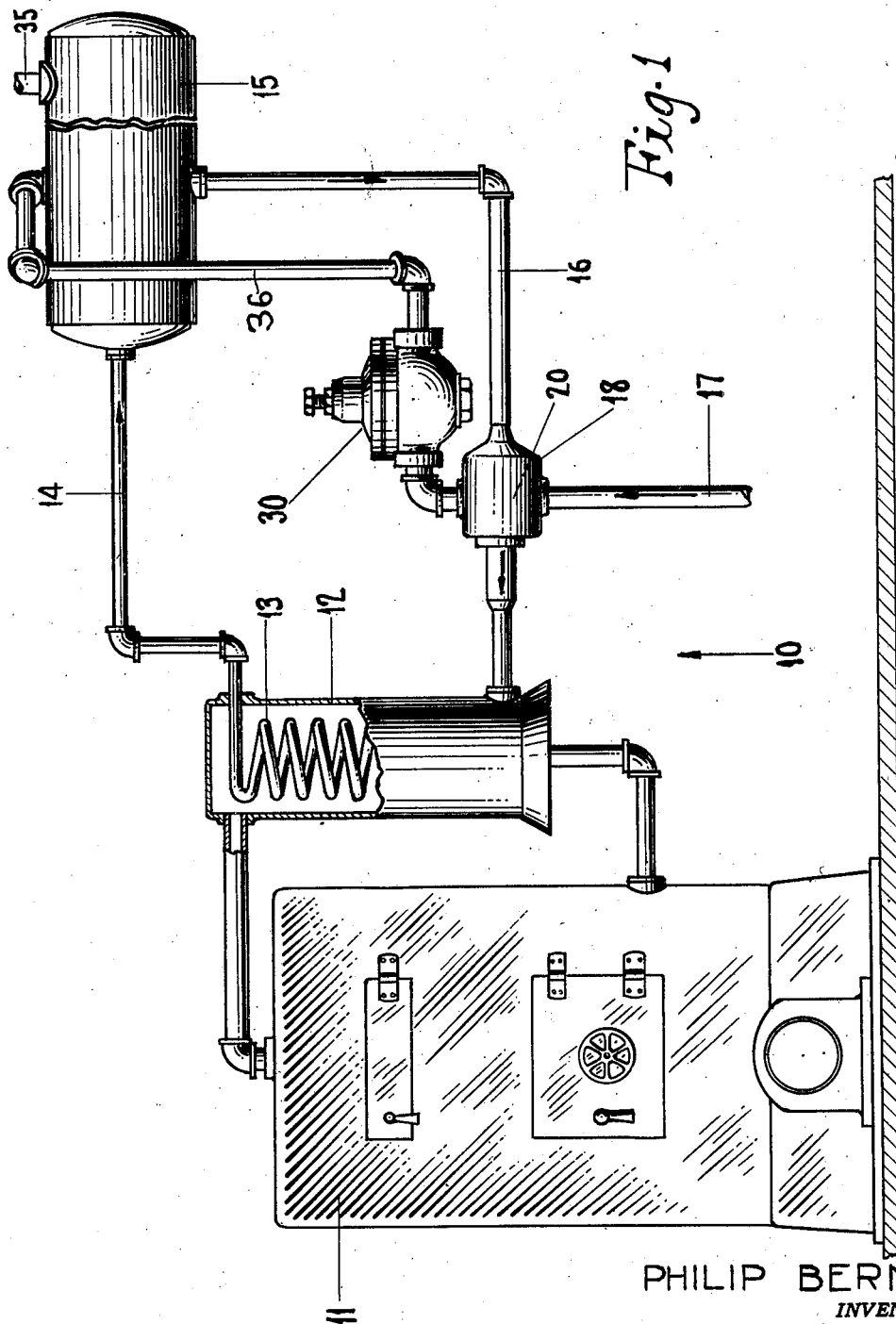
Figure 1 shows a hot water storage heating system having my invention applied thereto.
Figure 2:
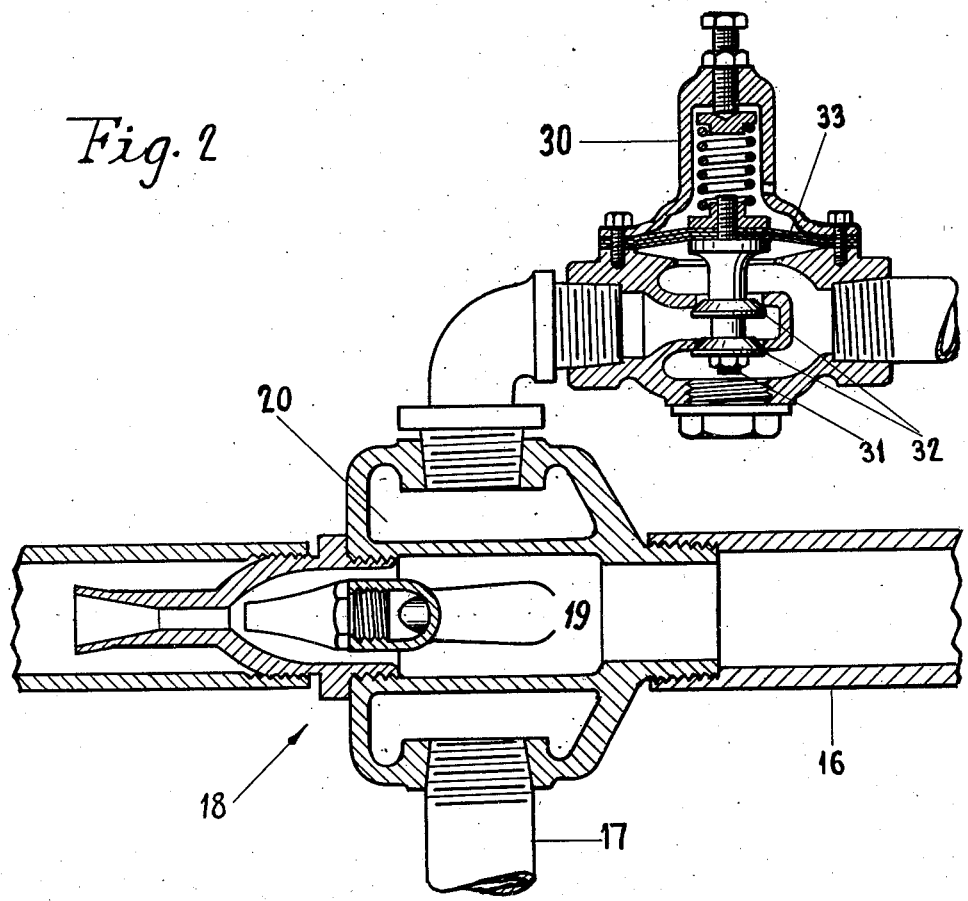
Figure 2 is a longitudinal cross-sectional view of the circulator and an equalizing valve.
Figure 3:
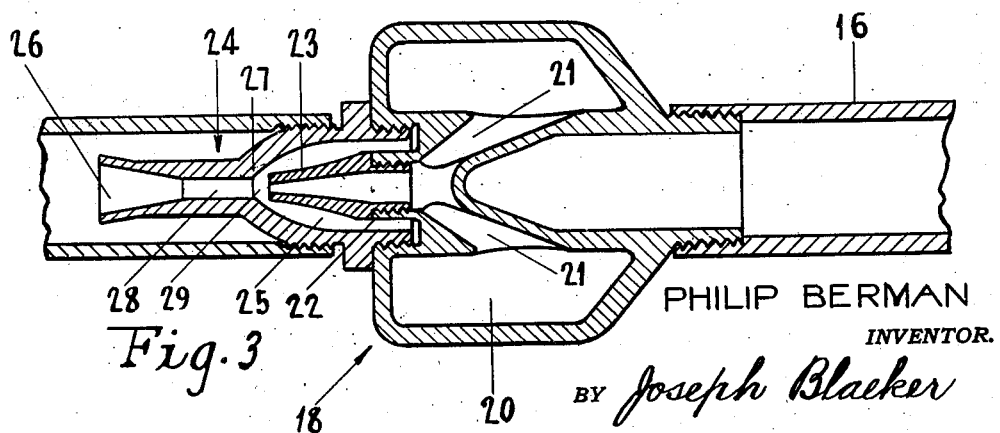
Figure 3 is a longitudinal cross-sectional view of the circulator showing two diametrically disposed nozzles.

In the illustrated embodiment of the invention the numeral 10 indicates a domestic hot water heating system comprising a hot water boiler 11 of any conventional construction. The heating system includes an auxiliary casing or indirect heater 12 through which the boiler water or steam freely circulates and in which is disposed a coil 13 included in the hot water supply system.

Hot water is supplied from the upper elevation of the heater 12 through a pipe 14 connected to the upper level of a hot water storage tank 15. Water is returned from the lower elevation of the storage tank 15 through a return pipe 16 entering the lower portion of the heater 12.

In the usual practice, the main 17 from the city water supply system is connected to the lower portion of the hot water storage tank 15 and the pressure serves only to fill the tank. I have found that by connecting the city pressure water supply line 17 direct to the circulating line 16 and by installing a water circulator 18 comprising a Venturi effect flow circulating means so as to form part of the said circulating line, that when the city water supply under pressure passes through the circulator 18, the pressure causes a suction at the exit from the circulator which augments the usual convection current circulation of the fluid in the said circulation line. The pressure of the city water supply is thus utilized to accelerate the usually sluggish circulation of the hot water.

The water circulator 18 comprises a tubular central portion 19 around which is a circumscribing storage chamber 20. A plurality of first stage nozzles 21 are positioned diametrically of said tubular body 19 and in V-shaped form with the apex of the V coinciding with the axis of the tubular body.

The outlet ends of the nozzles 21 terminate in a threaded socket 22 into which has been threaded a combining or second stage nozzle 23. The nozzle 23 has been positioned in alinement with the axis of the tubular body 19 and so that the said apex is positioned within said nozzle.

It is to be noted that the first stage nozzles 21 and the second stage nozzle 23 provide a series of nozzles or steps by means of which the total conversion of pressure into velocity is staged in steps.

A Venturi or compound tube 24 has been secured at the upper end of the tubular body 19 and in axial alinement therewith. The Venturi tube has a converging lower portion 25, a diverging upper portion 26, a throat 27 and a cylindrical tubular portion 28.

The nozzles 21 substantially join together at their upper ends and jointly discharge into the combining nozzle 23, the outlet of which terminates contiguous to the throat 27 of the Venturi tube 24, leaving an annular gap 29.

The nozzles 21 are of conical form so as to increase the velocity of the water entering the combining nozzle 23. The nozzle 23 is also of conical form to further increase the velocity of the water passing therethrough.

The combining nozzle 23 is directed axially through the converging passage 25 which passage may be curved and enlarged between its upper and lower ends, as shown, whereby the flow of the incoming liquid about the nozzle is facilitated.

In operation, the water passes through the successive nozzles 21 and 23. The first stage nozzles 21 and the second stage nozzle 23 cause the liquid discharge therethrough to be under increased high velocity. The nozzle 23 projects directly into the entrained stream so that the direction of the entrained stream is not changed. The entrained liquid is given an impulse by the circulator jet in the same direction exactly in which it is flowing.

The multi-stage liquid circulator imparts a double or compound impulse effect to the liquid and functions to repeatedly increase the velocity of the liquid and to create a high suction at the throat 27 of the Venturi tube 24, which suction can entrain and accelerate the circulation.

The outflow from the circulator is in submerged relation centrally of the circulation line. Due to the multiple stage construction of the circulator, the energy in the pressure water supply is fully converted into suction in the circulator.

I have provided an equalizing valve 30 in a by-pass line 36 in communication with the storage chamber 30 and with the hot water storage tank 15. The equalizing valve 30 comprises a spring loaded valve stem 31 having beveled valves 32 seated against upper beveled seats and held up against the seats by a diaphragm 33 which is acted upon by the water pressure in the tank 15.

The valve 30 is set to stay closed under a predetermined pressure in the tank and normally prevents passage of supply water from the main 17 to the storage tank. When removal of hot water through the service pipe 35 causes the pressure in the tank to drop, the valve operates automatically by opening the valve passages to permit passage therethrough of a supplementary supply of water to the tank.

Due to the circumscribing storage chamber 20 around the circulator 18 and due to the direct connection therewith with the valve 30, the valve receives a supplementary supply of water practically instantly and this results in a more perfect delivery of the supply water to the circulation system so that the moment any hot water is used for domestic purposes it is instantly replaced and the hydraulic system is at all times complete and ready for instant demands for hot water by the consumer.

The hot water heating system herein described operates automatically without auxiliary mechanical devices having moving parts.

It is to be noted that the usual conversion loss due to the conversion of motion into heat is in this case an asset to the system because the heat generated due to motion while small, still adds to the temperature of the water.

In accordance with the present statutes I have described and illustrated the preferred embodiment of my invention, but it will be understood that various changes and modifications can be made therein without departing from the spirit of the invention as defined by the appended claims.

I claim:

1. In combination with a hot water heating system having a water heater, a hot water storage tank, a hot water delivery line from said heater to said tank and a return pipe line from the tank to the heater, a water circulator in said return pipe line and comprising a Venturi effect flow-accelerating means, said circulator having an inlet for supply water, a water supply line under pressure leading to said Venturi means and to a by-pass to said storage tank, said Venturi means being arranged to cause increase of circulation of water in said heating system, a valve in the by-pass line loaded to normally prevent passage of said supply water to said storage tank but permitting passage therethrough to said tank when the pressure in said tank drops below a predetermined pressure.

2. In combination with a hot water heating system having a water heater, a hot water storage tank, a hot water delivery line from said heater to said tank and a return pipe line from the tank to the heater, a water circulator in said return pipe line and comprising a Venturi effect flow-accelerating means, said circulator comprising a circumscribing storage chamber having an inlet for supply water, a water supply line under pressure leading to said Venturi means and to said storage chamber and to a by-pass to said storage tank, said Venturi means being designed to cause increase of circulation of water in said heating system, a valve in the by-pass line loaded to normally prevent passage of said supply water to said storage tank but permitting passage therethrough to said tank when the pressure in said tank drops below a predetermined pressure.

3. In combination with a hot water heating system having a water heater, a hot water storage tank, a hot water delivery line from said heater to said tank and a return pipe line from the tank to the heater, a water circulator in said return pipe line and comprising a Venturi effect flow-accelerating means, said circulator having an inlet nozzle for supply water, a throat and a water supply line under pressure connected to said inlet nozzle, said flow-accelerating means being arranged in a direction to cause increase of circulation of water in said heating system, a hot water discharge pipe connected to said tank at a point remote from said hot water delivery line so as to cause all the circulating water to pass into said tank for recirculation and all the water drawn through said discharge pipe to come from the heated portion of said tank, said inlet nozzle, said throat and the outlet from said flow-accelerating means all being in a single linear arrangement.

4. In combination with a hot water heating system having a water heater, a hot water storage tank, a circulating pipe line for circulating water through said tank and past said heater, a water circulator in said pipe line and comprising a Venturi effect flow-accelerating means, said circulator having an inlet nozzle for supply water, a throat and a water supply line under pressure connected to said inlet nozzle, said flow-accelerating means being arranged in a direction to cause increase of circulation of water in said heating system, a hot water discharge pipe connected to said tank at a point remote from said hot water delivery line so as to cause all the circulating water to pass into said tank for recirculation and all the water drawn through said discharge pipe to come from the heated portion of said tank, said inlet nozzle, said throat and the outlet from said flow-accelerating means all being in a single linear arrangement.

5. In combination with a hot water heating system having a water heater, a hot water storage tank, a circulating pipe line for circulating water through said tank and past said heater, a water circulator in said pipe line and comprising a Venturi effect flow-accelerating means, said circulator having an inlet nozzle for supply water, a throat and a water supply line under pressure connected to said inlet nozzle, said flow-accelerating means being arranged in a direction to cause increase of circulation of water in said heating system, a hot water discharge pipe connected to said system at a point remote from the connection between said circulating pipe and said tank so as to cause all of the circulating water to pass into said tank and all the water drawn through said circulating system to come from the heated portion of said tank, said inlet nozzle, said throat and the outlet from said flow-accelerating means all being in a single linear arrangement.

PHILIP BERMAN.